United States Patent [19]
Kriechbaum et al.

[11] Patent Number: 6,136,462
[45] Date of Patent: Oct. 24, 2000

[54] HIGH TEMPERATURE FUEL CELLS WITH HEATING OF THE REACTION GAS

[75] Inventors: Karl Kriechbaum, Kassel; Gerhard Filip, Kronberg, both of Germany

[73] Assignee: AEG Energietechnik GmbH, Frankfurt, Germany

[21] Appl. No.: 09/027,208

[22] Filed: Feb. 20, 1998

[30] Foreign Application Priority Data

Feb. 21, 1997 [DE] Germany .......................... 197 06 584

[51] Int. Cl.$^7$ .................................................. H01M 8/04
[52] U.S. Cl. ............................... 429/24; 429/17; 429/20; 429/26
[58] Field of Search ............................... 429/17, 28, 24, 429/26

[56] References Cited

U.S. PATENT DOCUMENTS

| | | | |
|---|---|---|---|
| 3,198,664 | 8/1965 | Kunz | 429/24 |
| 3,253,957 | 5/1966 | Turner et al. | 429/24 |
| 3,539,397 | 11/1970 | Keating et al. | 429/24 |
| 3,595,699 | 7/1971 | Baude | 429/24 |
| 4,640,873 | 2/1987 | Tajima et al. | 427/24 |
| 4,923,768 | 5/1990 | Kaneko et al. | 429/19 |
| 5,441,821 | 8/1995 | Merritt et al. | 427/17 |

FOREIGN PATENT DOCUMENTS

| | | |
|---|---|---|
| 0075425A1 | 3/1983 | European Pat. Off. . |
| 2588612 | 4/1987 | France . |
| 195 26 774A1 | 1/1997 | Germany . |
| 196 20 501C1 | 6/1997 | Germany . |

*Primary Examiner*—Kathryn Gorgos
*Assistant Examiner*—Thomas H Parsons

[57] ABSTRACT

The invention relates to a fuel cell system with high-temperature fuel cells, in which some of the heat of the gases flowing out of the anode and cathode is used to that end. The gases that the flow into the anode and cathode are brought to a temperature that is required for operation of the fuel cells and is still tolerable for the cells, having an anode and/or cathode loop. It is provided that for the anode and/or cathode loop, at least that time-referred quantity of reaction gases that is required for attaining the electrical output of the fuel cells is furnished. From the gas flowing out of the anode and/or cathode, an equivalent quantity of gas is removed from the gas loop, and the gas quantity introduced into the loop is dimensioned such that by mixing this gas quantity with the gas returned to the loop from the anode and/or cathode, the temperature of the gas flowing into the anode and/or cathode attains a predetermined operating temperature that is optimal for the service life of the cells and for efficiency.

18 Claims, 1 Drawing Sheet

HIGH TEMPERATURE FUEL CELLS WITH HEATING OF THE REACTION GAS

BACKGROUND OF THE INVENTION

1. Field of the Invention

The invention relates to a system having high-temperature fuel cells with heating of the reaction gases, as generically defined by the preamble to claim 1.

2. Description of the Related Art

High-temperature fuel cells have operating temperatures in the range between 850 and 1000° C. Since only some of the energy of the fuel is converted into electrical energy, heat is created at the anode where the electrochemical process takes place, and this heat must be dissipated to the outside. This heat is predominantly dissipated out of the cell by means of an air stream amount in the cathode, which may be many times larger than that necessary for stoichiometry alone.

The heat of the gases flowing out of the anode and the cathode can be used to bring the gases flowing into the anode and cathode, via heat exchangers, to a temperature required for operation of the fuel cells and tolerable by them. Fuel cells with ceramic structural elements, however, do not tolerate major temperature differences. Yet this is only a problem that affects the peripheral processes in conjunction with fuel cells.

The energy that must be brought to bear in order to bring the air quantity flowing through the cathode to the operating pressure reduces the efficiency, and it is greater the more the air quantity exceeds the stoichiometrically required amount.

From the book entitled "System Design and Optimization in Fuel Cell Systems", edited by L. J. M. J. Blomen and M. N. Mugerwa, Plenum Press, New York 1993, pp. 201–244, it is known to utilize the heat of the air emerging from the cathode to heat the fresh air. This exchange takes place in a heat exchanger.

The exhaust gas with the residual hydrogen contained in it is generally combusted in an afterburner. Depending on the degree of conversion of the hydrogen in the fuel cell, this proportion of hydrogen, in terms of the total hydrogen used, is between 10 and 20%.

In fuel cells in which the fuel, such as natural gas, is converted or reformed with water vapor in the cells themselves, or in other words internally, into CO and $H_2$, it is necessary, for the sake of reliably avoiding soot emissions, to work with a water vapor excess.

In high-temperature fuel cells, $O_2^{2-}$ ions pass through the electrolyte from the cathode to the anode, where along with the hydrogen present there, water vapor is created.

If the gas emerging from the anode is diverted—admittedly, while utilizing the great majority of its heat—then prepared water must be evaporated constantly and supplied with the hydrogen to the anode; this is a requirement that in decentralized systems limits the possible uses of the fuel cells and also lowers efficiency.

The heat exchangers employed in the concepts that have become known until now are very expensive in terms of the space they require and their cost, especially heat exchangers for high temperatures.

BRIEF SUMMARY OF THE INVENTION

The object of the invention is to avoid the deficiencies of the concepts known until now and to improve efficiency.

This object is attained by the characteristics recited in the body of claim 1. Further refinements of the invention and a method for operating system are defined by the dependent claims.

What is essential for the invention is that into the anode and/or cathode loop, at least that time-referred quantity of reaction gases that is required for attaining the electrical output of the fuel cells is introduced;

that from the gases flowing out of the anode and cathode, a gas quantity equivalent to the introduced gas quantity is diverted from the loop;

that the gas quantities is dimensioned such that by mixing this gas quantity with the gas returned to the loop from the anode and/or cathode, the temperature of the gases flowing into the anode and/or cathode can be brought to the requisite level.

In a further feature of the invention, the fresh combustion gas introduced into the anode loop is passed through a reformer together with the gas, containing water vapor and hydrogen, of the anode loop and in this reformer is reformed entirely or in part. The temperature of the gas mixture entering the anode is dependent on the degree of reformation. Since the degree of reformation depends on the temperature of the reformer, the temperature of the gas mixture entering the anode can be varied by the thermal coupling of the reformer to the stack of fuel cells.

BRIEF DESCRIPTION OF THE DRAWINGS

The invention will be explained in further detail below in conjunction with the drawing.

DETAILED DESCRIPTION OF THE INVENTION

The function of the system will first be explained in terms of an example.

Figure 1:
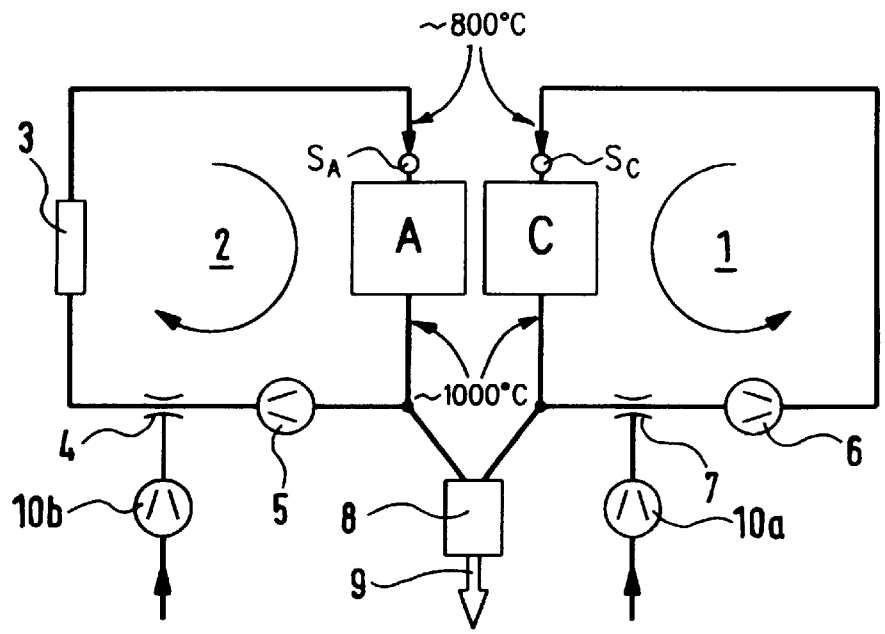
FIG. 1 shows the flow chart.

Fresh air is introduced into the cathode loop 1 via the fresh-air compressor 10a (FIG. 1), via the air injector 7. The air compressor 6 drives the air through the cathode K. A small portion of the cathode exhaust air is diverted to the afterburner 8, but the majority flows through the air injector 7 and the air compressor 6. On the anode side, combustion gas is brought into the anode loop 2 via the combustion gas compressor 10b and the combustion gas injector 4. The gas mixture flows through the reformer 3 and enters the anode A. A small portion of the gas emerging from the anode is diverted to the afterburner 8, but the majority, driven by the combustion gas compressor 5, returns to the anode loop. The energy of the exhaust gas 9 of the afterburner 9 is advantageously utilized in a gas turbine; this is because in this way, efficiencies that exceed 70% can be attained. The air compressors 5,6 may have ceramic components. Two temperature sensors $S_A$, $S_C$ are provided on the inlet side of the gases upstream of the anode and cathode to measure temperatures at these locations. The deviation of the measure temperature from a set point temperature is then used to regulate a quantity of gas introduced into the respective loop.

Figure 2:
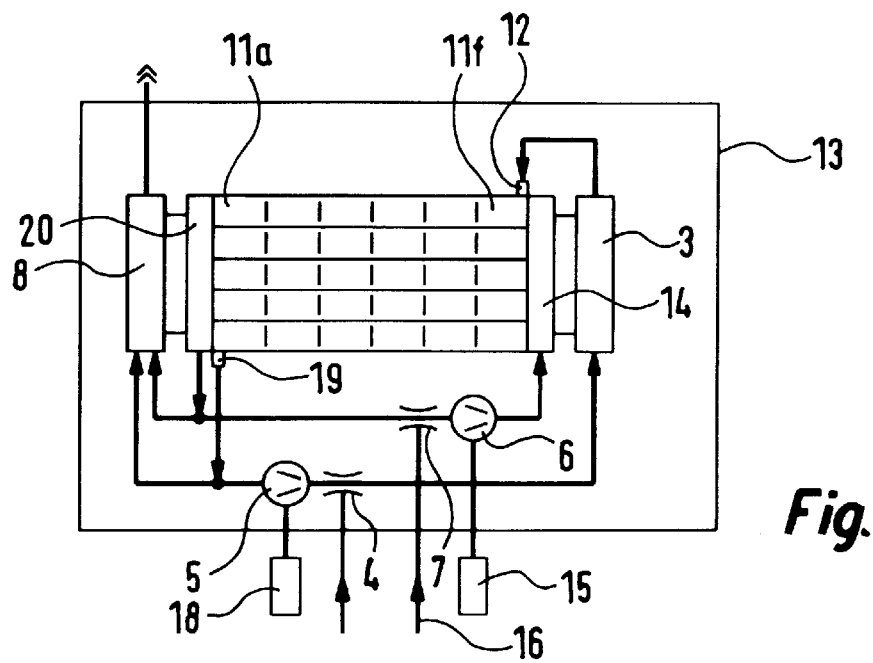
FIG. 2 is a schematic section through a module.

FIG. 2 shows a schematic arrangement of the components. In a casing 13, individual columns of stacks 11a–11e are provided. In the exemplary shown, they are connected in series on the combustion gas and air sides. The combustion gas enters the stack arrangement at 12 and leaves it at 19. The air enters the stack arrangement via a hood 14 and leaves it via the hood 20. Waste air from this hood 20 is carried back to the hood 14 via the air injector 7 and the air compressor 6. Compressed fresh air—the compressor is not shown in FIG. 2—enters the air injector 7 via the inlet 16.

Some of the anode exhaust gas 19 is carried into the afterburner 8 along with some of the waste air from the hood 20 and is combusted there; the majority, driven by the combustion gas compressor 5, is carried via the injector 4 and via the reformer 3 to the combustion gas inlet 12.

Reference numerals 18 and 15 indicate the drive motors of the combustion gas and air compressors, respectively.

The air loop is kept at high temperature and at comparatively high operating pressures, such as 10 bar. To achieve this it is necessary that the regulation of the temperature of the air entering the cathode be done by varying the rpm of the compressor and by varying the air quantity supplied.

To cool the stack of fuel cells and in particular to reduce the temperature gradient in the stacks of fuel cells, cooling on the cathode side is necessary, with an air quantity which can amount to a multiple, for instance five times, the stoichiometrically necessary air quantity.

The compressor in the air loop needs to compensate only for the comparatively slight pressure difference in the stack of fuel cells, which amounts to only one-tenth of a bar.

The drive of the compressors in both loops takes place either electromagnetically or by means of the gas removed from the cathode loop.

In addition, heat from the stack of fuel cells is fed into the reformer in the anode loop. The degree of thermal insulation between the stack of fuel cells and the reformer is dimensioned in accordance with the quantity of heat to be transferred to the reformer at the rated output. For a partial output, less heat is needed in the reformer. The temperature difference between the stack of fuel cells and the reformer decreases, so that less heat is also transferred. The active surface of the catalytic converter in the reformer is also dimensioned in accordance with the rated output, so that the advantages of the system according to the invention are as follows:

1. The system does not require any of the usual heat exchangers. Thus their disadvantages are eliminated:
   their large structural volume;
   their high cost, especially for heat exchangers for high temperatures;
   the major effort involved in controlling the thermal expansions of the pipes to be connected to them.
2. Since the system is very compact in structure, heat losses are only slight. High efficiency can therefore be expected. By way of example, the structural volume of the system is only approximately one-fourth that of the most recent system concepts of the conventional type using heat exchangers.
3. No water vapor is supplied during operation. The water vapor produced in the anode chamber is returned to the anode chamber. This property makes the system independent of its location and makes it highly acceptable ecologically, thus widening the range of potential applications of decentralized systems.
4. The anode loop leads to higher utilization of the hydrogen. This makes a substantial contribution to increasing the efficiency. The quantity of hydrogen not converted in the cell is reduced to less than half. For a utilization rate of 90%, this leads to an approximately 5% improvement in efficiency.
5. The compressor in the anode loop need not be hydrogen-tight. The hydrogen emerging in particular via the bearings is part of the hydrogen that has to be diverted from the loop anyway. The demands made of the bearings are thus less, which increases the service life of the compressors.
6. The exhaust gas is leaner than in known concepts with immediate combustion of the anode exhaust gases. Thus lower temperatures develop in the afterburning, with less formation of $NO_x$.

| | List of Reference Numerals |
|---|---|
| A | Anode |
| K | Cathode |
| 1 | Cathode loop |
| 2 | Anode loop |
| 3 | Reformer |
| 4 | Combustion gas injector |
| 5 | Combustion gas compressor |
| 6 | Air compressor |
| 7 | Air injector |
| 8 | Afterburner |
| 9 | Exhaust gas, whose energy can be utilized in a gas turbine |
| 10a | Fresh-air compressor |
| 10b | Combustion gas compressor |
| 11a–11f | Rows of stacks of fuel cells |
| 12 | Anode inlet line |
| 13 | Casing |
| 14 | Cathode inlet line |
| 15 | Drive motor for air compressor |
| 16 | Air inlet |
| 17 | Combustion gas inlet |
| 18 | Drive motor for combustion gas compressor |
| 19 | Anode outlet line |
| 20 | Cathode outlet line |
| $S_A$ | Temperature sensor on the anode inlet side |
| $S_C$ | Temperature sensor on the cathode inlet side |

What is claimed is:

1. A high-temperature fuel cell system, the system using heat contained in gases flowing out of fuel cells to heat combustion gas and air to a required fuel cell operation temperature, the fuel cell system comprising:
   at least one stack of high temperature fuel cells;
   an anode circuit for delivering the combustion gas to an anode;
   a cathode circuit for delivering air to a cathode;
   a first combustion gas compressor communicating with said anode circuit to bring the combustion gas to a required combustion gas pressure for introduction into said anode circuit;
   a first air compressor communicating with said cathode circuit to bring the air to a required air pressure for introduction into said cathode circuit;
   a first temperature sensor disposed proximate an inlet side of the air upstream of said cathode; and
   first means for regulating a quantity of air introduced into said cathode circuit in dependence on a deviation of a first temperature, measured by said first temperature sensor, from a first set-point temperature.

2. The high-temperature fuel cell system of claim 1, further comprising a second temperature sensor disposed proximate an inlet side of the combustion gas upstream of said anode, and second means for regulating a quantity of combustion gas introduced into said anode circuit in dependence on a deviation of a second temperature, measured by said second temperature sensor, from a second set-point temperature.

3. The high-temperature fuel cell system of claim 1, further comprising a reformer disposed in said anode circuit for reforming combustion gas.

4. The high-temperature fuel cell system of claim 1, further comprising an afterburner disposed outside of and in communication with said anode and said cathode circuits for combustion of some combustible gas emerging from said anode circuit with some gases emerging from said cathode circuit.

5. The high-temperature fuel combustion cell system of claim 1, further comprising at least one of a second combustion gas compressor and a second air compressor disposed in at least one of said anode circuit and said cathode circuit to effect gas flow.

6. The high-temperature fuel cell system of claim 5, wherein at least one of said second combustion gas compressor and said second air compressor comprise turbocharging means.

7. The high-temperature fuel cell system of claim 5, wherein at least one of said second combustion gas compressor and said second air compressor comprise ceramic components.

8. A method for operating a high-temperature fuel cell system, the system having at least one stack of high temperature fuel cells, the system using heat contained in gases flowing out of fuel cells to heat combustion gas and air to a required fuel cell operation temperature, the method comprising the steps of:

a) pressurizing the combustion gas via a first combustion gas compressor to bring the combustion gas to a combustion gas pressure for introduction into an anode circuit;

b) pressurizing the air via a first air compressor to bring the air to a required air pressure for introduction into a cathode circuit;

c) delivering the combustion gas to an anode in said anode circuit;

d) delivering air to a cathode in said cathode circuit;

e) measuring a first temperature at a first location proximate an inlet side of the air upstream of said cathode; and f) regulating a quantity of air introduced into said cathode circuit in dependence on a deviation of said first temperature from a first set-point temperature.

9. The method of claim 8, further comprising the seeps of:

g) measuring a second temperature at a second location proximate an inlet side of the combustion gas upstream of said anode; and h) regulating a quantity of combustion gas introduced into said anode circuit in dependence on a deviation of said second temperature from a second set-point temperature.

10. The method of claim 9, wherein step h) comprises the step of regulating a quantity of combustion gas introduced into said anode circuit and mixed with combustion gas exhausted from said anode to obtain an optimal operating temperature of combustion gas flowing into said anode.

11. The method of claim 9, wherein fresh combustion gas is introduced into said anode circuit via a combustion gas injector.

12. The method of claim 8, wherein quantities of combustion gas and air required for attaining an electrical output of the fuel cells are introduced into said anode and said cathode circuits.

13. The method of claim 8, wherein step f) comprises the step of regulating a quantity of air introduced into said cathode circuit and mixed with air exhausted from said cathode to obtain an optimal operating temperature of air flowing into said cathode.

14. The method of claim 8, wherein fresh air is introduced into said cathode circuit via an air injector.

15. The method of claim 8, wherein fresh combustion gas is introduced into said anode circuit via a combustion gas injector.

16. The method of claim 8, wherein said combustion gas is brought to a requisite pressure via a compressor.

17. The method of claim 8, wherein, in the anode circuit, fresh combustion gas mixed with anode exhaust gas is passed through a reformer before being fed into said anode.

18. The method of claim 17, wherein fuel cell output heat is introduced into said reformer.

* * * * *